UNITED STATES PATENT OFFICE.

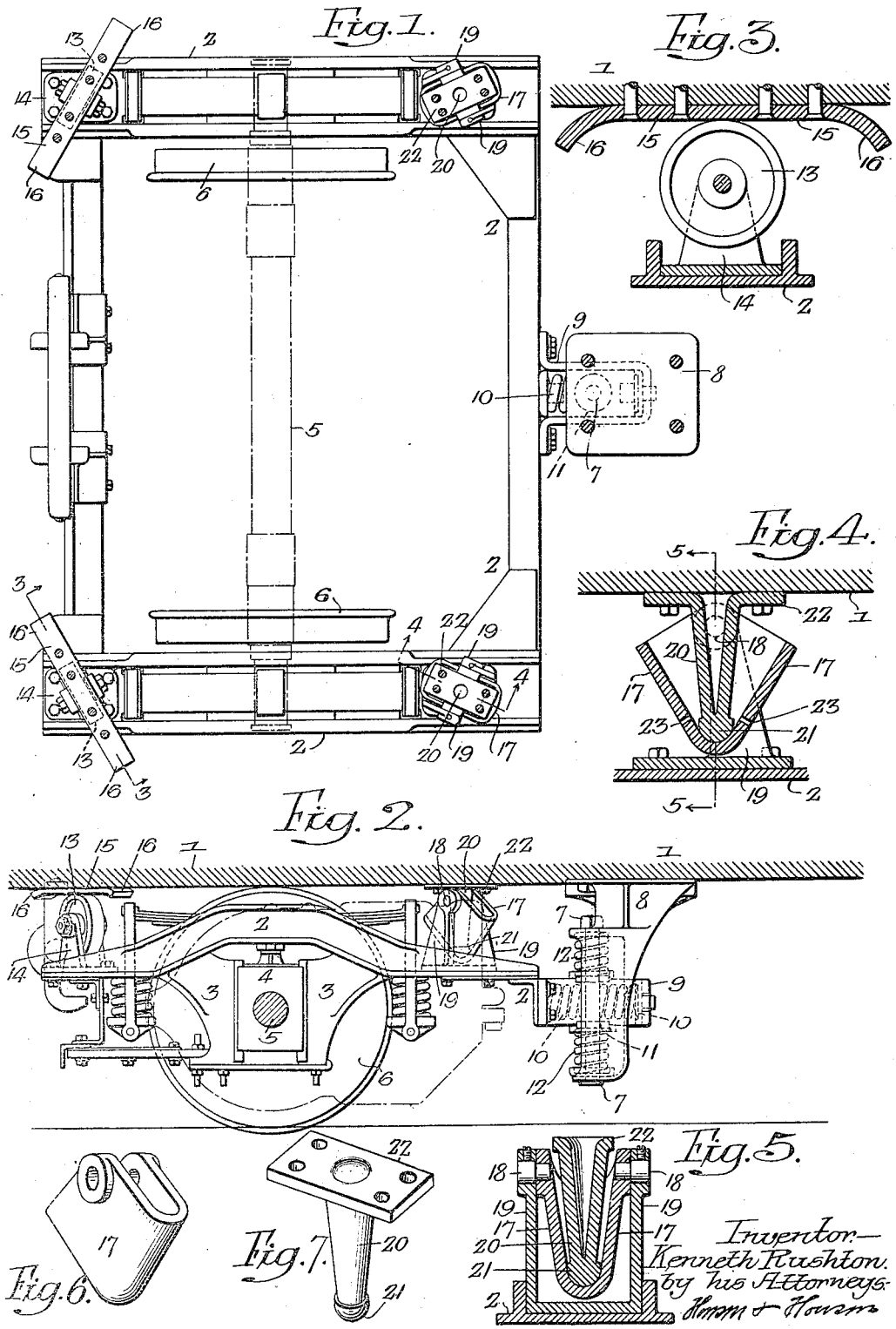

KENNETH RUSHTON, OF PHILADELPHIA, PENNSYLVANIA, ASSIGNOR TO THE BALDWIN LOCOMOTIVE WORKS, OF PHILADELPHIA, PENNSYLVANIA, A CORPORATION OF PENNSYLVANIA.

CAR-TRUCK.

1,265,389.              Specification of Letters Patent.       Patented May 7, 1918.

Application filed November 10, 1917. Serial No. 201,233.

*To all whom it may concern:*

Be it known that I, KENNETH RUSHTON, a citizen of the United States, residing in Philadelphia, Pennsylvania, have invented certain Improvements in Car-Trucks, of which the following is a specification.

My invention relates to certain improvements in pivoted two wheel trucks, especially adapted to be used in connection with electrically driven cars.

One object of the invention is to provide means for properly supporting the car body on the trucks so that the trucks will turn curves and will adapt themselves to the tracks more readily than heretofore.

A further object of the invention is to provide means by which the car body will ride easier on the trucks than heretofore.

These objects and other advantageous ends I secure, reference being had to the accompanying drawings, in which:—

Figure 1 is a plan view of a truck illustrating my invention, the car body being omitted;

Fig. 2 is a side view of the truck showing the car body in section;

Fig. 3 is a sectional view on the line 3—3, Fig. 1;

Fig. 4 is a sectional view on the line 4—4, Fig. 1;

Fig. 5 is a sectional view on the line 5—5, Fig. 4;

Fig. 6 is a detached perspective view of the swinging cradle forming an element of one of the supports; and Fig. 7 is a detached perspective view of the pin forming another element of one of the swinging supports.

It is the usual practice to locate two of these trucks under the car body, the trucks being pivoted off center and each truck has a single axle and two wheels.

Referring to the drawing, 1 is the body of the car. 2 is the frame of the truck made in any form desired, having pedestals 3 for the boxes 4 of the axle 5 on which are the wheels 6. The frame 2 is spring supported. While I have shown one method of supporting the frame, other methods may be used without departing from the essential features of the invention.

7 is a vertical pivot pin connecting the truck with the car body. This pivot pin is mounted in a bracket 8 secured to the under side of the car body and the pin passes through a box 11 located in a strap bearing 9 secured to one end of the truck frame, as clearly shown in Figs. 1 and 2. Springs 10 are located on each side of the box 11 and springs 12 are located on the pin 7 above and below the box, so that there is a spring connection between the frame of the body and the frame of the truck. In this type of truck it has been the usual practice to mount the car body on spring supports located at the four corners of the truck, but this construction is objectionable in that the supports shift out of line and there is considerable friction between the supports and the car body.

In my construction at each corner of the truck farthest from the pivot is a roller 13 mounted in a suitable bearing 14, bolted to the frame of the truck. Mounted on the under side of the car body is a rail 15 secured to the car by bolts, or other fastenings. The ends of the rails are turned down, as at 16, Fig. 3. The rollers and rails are mounted on a radial line from the pivot so that, as the truck under the car body moves, the rollers travel on the rails and properly support the car body at this end of the truck. At the opposite end of the truck, nearest the pivot at each side, is a swinging cradle or socket 17 mounted on pivot pins 18 adapted to bearings 19 secured to the truck frame. This socket is made as shown in Figs. 4, 5 and 6, and adapted to the socket is a pin 20 having a rounded head 21 arranged to rest on the curved bottom of the socket and having a flange 22, which is secured to the car body so that as the car body or the truck turns on the pivot, the pins 20 will move out of line with the vertical center line through the pivots of the socket and will cause the socket to swing to either side of the center.

Near the base of the socket are perforations 23 to allow for the escape of any water or dirt that has accumulated in the socket. By this construction, a lubricant can be located in the bottom of the socket 5 so as to prevent the binding of the parts. The truck, as it swings to one side in passing around a curve, for instance, will readily assume its position, as the rollers 13 will travel on the rails 15 secured to the car body and the pin 20 will rock the cradle or socket to one side of the line of the pivot. As soon as the truck passes the curve the pin and socket connection will cause it to assume its proper position in respect to the car body. Thus the movement of the trucks under the car body will be free and easy.

I claim:

1. The combination of a car body; a truck mounted on the car body; a pivot for the truck at one side of the center thereof; an axle; bearings for the axle mounted on the truck frame; a roller at each corner of the truck frame farthest from the pivot; a rail above each roller secured to the car body; a bearing at the two opposite corners of the truck from the rollers; pivoted cradles mounted in the bearings; and pins depending from the car body and adapted to the sockets.

2. The combination in a car body, of a truck frame pivotally mounted under the car body, the pivot being at one side of the truck; a single axle; boxes in the the truck frame in which the axle is mounted; a roller at each corner of the truck farthest from the pivot; a rail above each roller secured to the body of the car; bearings at the opposite corners of the truck from the rollers; cradles pivotally mounted in the bearings; a pin projecting from the bottom of the car body and resting in each socket; and a yielding connection at the pivot between the car body and the truck.

3. The combination of a car body; a truck mounted under the car body and pivoted thereto, and a pin and swinging cradle connection between the truck and the body some distance from the pivot.

4. The combination of a car body; a truck mounted under the car body and pivoted thereto; a bearing at two corners of the truck; a swinging cradle pivotally mounted in the bearings and having flared ends; a pin projecting from the car body and entering each cradle, said pin having a rounded head adapted to rest in the base of the socket so that when the car body and truck move, one in respect to the other, the socket will swing.

In witness whereof I affix my signature.

KENNETH RUSHTON.